United States Patent
Holder (10) Patent No.: US 6,910,278 B2
(45) Date of Patent: Jun. 28, 2005

(54) APPARATUS AND METHOD FOR INSPECTING AND MARKING REPAIR AREAS ON A BLADE

(75) Inventor: Paul F. Holder, Santa Clarita, CA (US)

(73) Assignee: Lockheed Martin Corporation, Rockledge, MD (US)

( * ) Notice: Subject to any disclaimer, the term of this patent is extended or adjusted under 35 U.S.C. 154(b) by 72 days.

(21) Appl. No.: 10/355,582

(22) Filed: Jan. 30, 2003

(65) Prior Publication Data

US 2004/0148793 A1 Aug. 5, 2004

(51) Int. Cl.[7] ................................................. G01B 3/14
(52) U.S. Cl. ......................................... 33/562; 33/530
(58) Field of Search ........................... 33/562, 530, 563, 33/533, 613, 645, DIG. 1, 1 BB (56) References Cited

U.S. PATENT DOCUMENTS

| | | | | |
|---|---|---|---|---|
| 2,170,824 A | * | 8/1939 | Lichtenwalner | 33/368 |
| 2,535,791 A | * | 12/1950 | Fluke | 33/347 |
| 2,749,623 A | * | 6/1956 | Barre, Jr. et al. | 33/530 |
| 3,832,785 A | * | 9/1974 | Miller | 33/563 |
| 4,279,259 A | * | 7/1981 | Lee et al. | 600/587 |
| 4,451,989 A | * | 6/1984 | Leistiko | 33/286 |
| 4,639,991 A | * | 2/1987 | Sharon | 29/889.7 |
| 5,265,605 A | * | 11/1993 | Afflerbach | 600/300 |
| 5,375,978 A | * | 12/1994 | Evans et al. | 416/230 |
| 5,625,958 A | * | 5/1997 | DeCoursey et al. | 33/555 |
| 5,741,212 A | * | 4/1998 | Matthews | 600/300 |
| 6,192,595 B1 | * | 2/2001 | Stewart | 33/530 |
| 6,219,930 B1 | * | 4/2001 | Reid | 33/562 |
| 6,238,187 B1 | * | 5/2001 | Dulaney et al. | 416/241 R |
| 6,341,429 B1 | * | 1/2002 | Herskovitz | 33/512 |
| 6,341,936 B1 | | 1/2002 | Cowie et al. | |

FOREIGN PATENT DOCUMENTS

| | | |
|---|---|---|
| DE | 44 30 526 A | 1/1995 |
| EP | 0 907 077 A2 | 4/1999 |

* cited by examiner

Primary Examiner—G. Bradley Bennett
Assistant Examiner—Amy R. Cohen
(74) Attorney, Agent, or Firm—Koestner Bertani LLP (57) ABSTRACT

A template for assessing damaged areas on a blade includes a set of marks indicating the maximum areas of damage allowed on an edge, as well as the tip of a blade. A guide enables the template to be aligned in proper position against the blade for accurate visual inspection of the damaged areas. One or more blend guides are included to allow the inspector to mark a blend area around the damage to enable maintenance personnel to smooth sharp, jagged edges of the damaged areas, thereby relieving stress points on the blade and improving the aerodynamic efficiency of the blade. The template is fabricated with transparent material that allows the blade to be viewed when the template is overlayed on the blade. A mechanism such as a clip, a sleeve, or magnetic attraction can be included on the template to retain the template on the blade during inspection.

21 Claims, 8 Drawing Sheets

APPARATUS AND METHOD FOR INSPECTING AND MARKING REPAIR AREAS ON A BLADE

STATEMENT OF GOVERNMENT INTEREST

The invention was made with Government support under contract F33657-98-D-0117, awarded by the U.S. Government. The U.S. Government has certain rights in this invention.

BACKGROUND

1. Technical Field

The present invention relates to geometrical instruments, and more particularly to a template for inspecting blade damage and marking the damaged area for repair.

2. Description of the Related Art

Foreign object damage (FOD) on aircraft turbine engine blades is a condition defined as any damage from small nicks and scratches to complete disablement or destruction of an engine caused by damaged parts of blades that break loose during operation. The blades rotate at very high speeds, and various levels of damage can be inflicted by foreign objects striking the blades, depending on the speed of the blades, the speed of the aircraft, and the size and hardness of the object.

FOD can be caused in a variety of ways including rocks or other hard objects being ingested by the engine during operation in the air or on the ground. Another source of FOD arises when components such as nuts, bolts, or tools are mistakenly left in or near the engine during maintenance. Additionally, leading and trailing edges of blades are subject to gradual erosion from abrasive sand and grit particles in the air that is ingested by the engine during operation. Another common source of engine FOD is in-flight icing that forms on the airframe or engine itself, breaks off and is ingested by the engine.

A typical engine has hundreds of blades which must be inspected for cracks, foreign object damage (FOD), and corrosion. Damaged and eroded blades degrade engine performance, as well as posing a potential cause of engine failure, and therefore must be replaced once the damage or erosion has exceeded a certain level. The flight crew is often not aware of FOD, however, in case of extensive damage, it can be indicated by vibration and changes in the engine's normal operating parameters. For example, damage to fan or compressor blades results in an increase in exhaust gas temperature (EGT), decrease in engine pressure ratio (EPR), and a change in the speed (RPM) ratio between the core engine and the fan section (N2/N1). Visual inspection for substantial damage to inlet fan blades and guide vanes is required to determine whether a blade can be repaired, or must be replaced.

A certain level of damage to a blade does not pose a serious threat to operational safety or performance. Guidelines regarding the extent of visible blade damage allowed are often provided to enable maintenance personnel to judge whether the blade must be repaired or replaced before further use. The amount of allowable damage can vary depending on the location of the damage along the length of the blade. The guidelines are typically expressed in terms of a percentage or amount of the leading and trailing edges of the chord (width) of the blade that may be missing before repair or replacement is required.

It is often difficult to visually gauge the amount of a blade that is missing without a measuring aid, such as a ruler. One known method of visual inspection includes marking damage limits at the tip and the bottom (root) of the blade. A straight line is drawn along the length of the blade between the marks at the tip and the root. The marks can be drawn on the leading edge and/or the trailing edge, depending whether both edges of the blade are damaged.

Once the allowable limits for damage to the blade are marked on the blade, the inspector can determine whether the blade must be replaced. When a damaged area on a blade is determined to be within a tolerable range, it is often desirable to blend the sharp edges of the damage to improve aerodynamic performance of the blade. The blending process also helps relieve stress points, thereby helping to avoid further cracking/damage to the blade during operation of the engine. Typically, an inspector will mark a small arc around the damaged area to indicate the area to be blended.

Thus, the inspector must measure along the length and the width of the blade to gauge each area of damage on both the leading and the trailing edges. Typically, a blade will have an aerodynamic contour that includes a cambered airfoil along the chord with a slight twist along the length of the blade. The contour can add to the difficulty of measuring the blade with a conventional straightedge ruler. Additionally, fan and compressor blades are typically tapered along their length from root to tip, further adding to the difficulty of determining whether the damage is within allowable limits. The problem is exacerbated on aircraft with inlet ducts, which do not allow easy access to inspect the blades.

A visual inspection of the engine fan blades is typically conducted on a routine basis. Considering the number of jet engines in service, millions of man-hours are required each year to complete the inspections. The blade inspection procedure outlined above is awkward, time-consuming, and prone to human error. It is therefore desirable to provide a device to facilitate more accurate and efficient visual fan and compressor blade inspection. It is also desirable to include a guide for marking the blend areas on the damaged portions of the blade with the inspection device.

SUMMARY

Against this background of known technology, an apparatus for assessing damaged areas on a blade includes a set of marks indicating the maximum areas of damage allowed on a blade. A profile guide enables the inspector to align the template in proper position against the blade for accurate visual inspection of the damaged areas. One or more blend guides are included to allow the inspector to mark a blend area around damage within the allowable limits, and to enable maintenance personnel to smooth sharp, jagged edges of the damaged areas, thereby relieving stress points on the blade and improving the aerodynamic efficiency of the blade. The template is fabricated with transparent material that allows the blade to be viewed when the template is overlayed on the blade.

Other advantages and features of the invention will become more apparent, as will equivalent structures which are intended to be covered herein, with the teaching of the principles of embodiments of the present invention as disclosed in the following description, claims, and drawings.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein.

DETAILED DESCRIPTION OF THE EMBODIMENTS

Figures 1A, 1B:
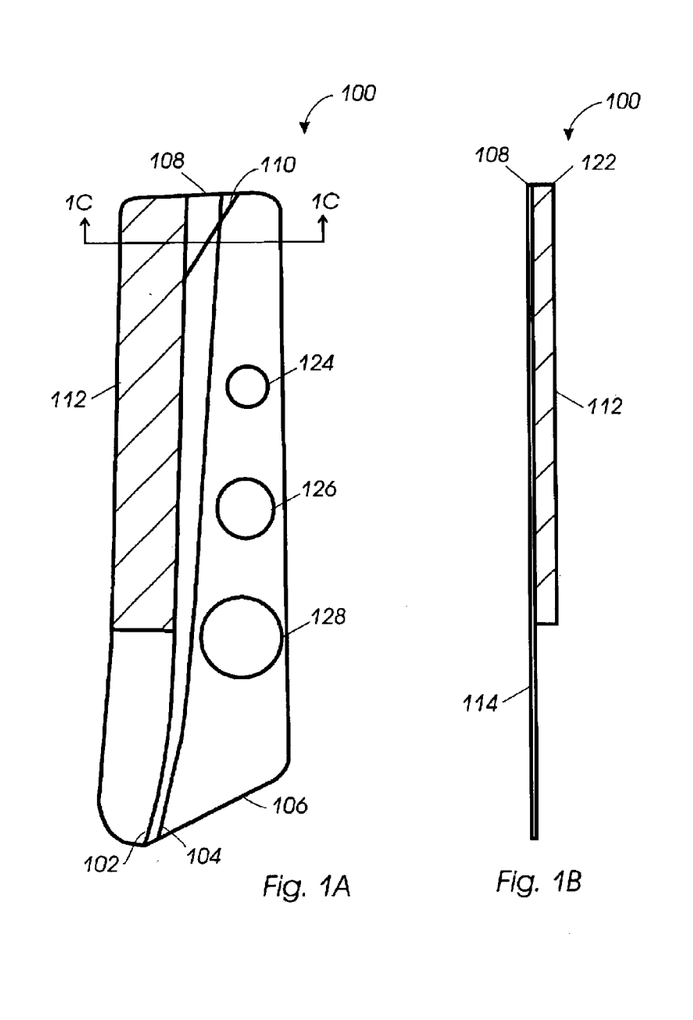
FIG. 1A shows a front view of an embodiment of a template for inspecting blades.
FIG. 1B shows a side view of the template of FIG. 1A.
Figure 1C:
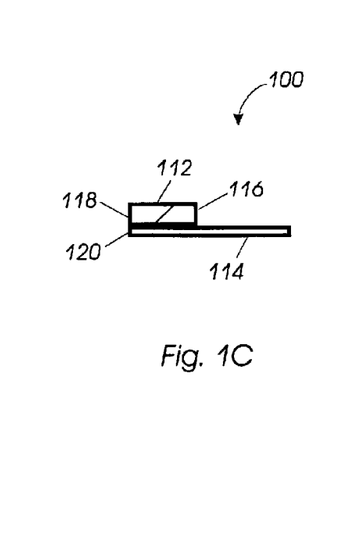
FIG. 1C shows a cross-sectional view of the template of FIG. 1A.

Referring to FIGS. 1A through 1C, FIG. 1A shows a front view of an embodiment of template 100, which can be used to determine whether damage or erosion extends beyond allowable limits on virtually any type of blade. Template 100 is typically sized and shaped to substantially conform to at least a portion of the blade being inspected and includes one or more marks that indicate the maximum areas of damage allowed on any part of the blade, such as one or both of leading and trailing edges as well as the tip of a blade.

In the embodiment of template 100 shown in FIG. 1A, alignment mark 102 is provided to allow the inspector to align template 100 with at least a portion of the blade being inspected. When alignment mark 102 of template 100 is aligned with the corresponding portion of the blade, damage limit mark 104 provides an indication of the amount of the blade that can be damaged or eroded before the blade must be replaced. In the embodiment shown, damage that extends between alignment mark 102 and damage limit mark 104 is considered to be within an allowable range. Damage that extends from alignment mark 102 to beyond damage limit mark 104 exceeds the allowable range, and indicates that the blade should be replaced.

Alignment mark 102 and damage limit mark 104 are shown as lines extending from root 106 to tip 108 with a slight curvature near the root 106 in the embodiment of template 100 shown in FIG. 1A. The distance between alignment mark 102 and damage limit mark 104 increases gradually from root 106 to tip 108. Thus, a greater amount of damage to the leading edge of the blade is allowed at tip 108 than at root 106. One reason for allowing more damage near the tip 108 is because smaller pieces of the blade are less likely than larger, heavier pieces to be projected outside the engine.

In other embodiments, the length, shape, and distance between alignment mark 102 and damage limit mark 104 can vary, depending on the shape of the blade, the areas to be inspected, and the amount of allowable damage different areas of the blade can sustain before the blade is replaced.

Alignment mark(s) 102 can be positioned to indicate all or a portion of the leading edge, trailing edge, tip, root, and/or other portions of a blade that is sufficient to align template 100 for visual inspection of the blade. Further, more than one damage limit mark 104 and/or alignment mark 102 can be included on template 100. Different combinations of damage limit mark(s) 104 and alignment marks 102 can be included on the same template 100 so that the template 100 can be used to inspect different blades having different profiles and damage tolerances. Separate templates for each blade configuration are typically utilized, however.

Template 100 can also include other types of damage limit marks 104 to indicate whether damage to various other portions of the blade are within pre-specified tolerances. An example of another type of damage limit mark shown on the embodiment of template 100 in FIG. 1A is tip chamfer mark 110, which extends upward at an angle from alignment mark 102 to tip 108 of template 100. In the example shown, tip chamfer mark 110 extends beyond damage limit mark 104 at the tip 108 of template 100, however, the length, shape, and angle of tip chamfer mark 110 between alignment mark 102 and tip 108 can vary, depending on the shape of the blade, and the amount of allowable damage that can be sustained at the tip of the blade before the blade must be replaced.

Template 100 can also include one or more blend guides that allows an inspector to mark blend lines around damage areas to indicate the maximum amount of blade that may be removed without exceeding the maximum damage limit mark 104 during the blending process. Maintenance personnel use the blend marks as limits of the amount of material that can be removed from blade 300 to smooth sharp, jagged edges of the damaged areas, thereby relieving stress points on the blade and improving the aerodynamic efficiency of the blade.

The embodiment of the template 100 shown includes three circular blend guides 124, 126, 128 that each have a different radius. The smallest blend guide 124 is sized according to the minimum allowable blend radius. Blend guides 124, 126, 128 can be formed by cutting holes in template 100. Template 100 can, however, include blend guides that are formed using any suitable method and have different shapes and sizes than shown in the embodiment of template 100 in FIG. 1A.

In some embodiments, template 100 is configured to substantially correspond to the size and shape of the entire blade to be inspected. In other embodiments, template 100 is configured to correspond to only a portion of the blade to be inspected, such as the leading edge, a portion of the leading edge, the tip, a portion of the tip, the trailing edge, or a portion of the trailing edge.

FIGS. 1B and 1C show a side view and a cross-sectional view, respectively, of template 100 with alignment guide 112 attached to one side of face plate 114. Alignment guide 112 enables an inspector to align template 100 in proper position against the blade for accurate visual inspection of the damaged areas. In the embodiment shown, alignment guide 112 includes a raised side portion 116 that coincides with at least a portion of alignment mark 102. The thickness of the raised portion is selected so that the alignment guide 112 can be abutted against a portion of the blade to properly position alignment mark 102 and damage limit mark 104 relative to the portion(s) of the blade to be inspected.

Alignment guide 112 can be fastened to face plate 114 using any suitable attachment means, such as adhesive or other type of bonding, mechanical fasteners, or co-formed in a unitary construction with face plate 114. In the embodiment shown, alignment guide 112 is a rectangularly-shaped portion of material having a first side 118 aligned with a portion of an outer edge 120 of face plate 114. A top portion 122 of alignment guide 112 is aligned with a portion of tip 108 of face place 114. Raised side portion 116 of alignment guide 112 is aligned with a portion of alignment mark 102. Notably, alignment guide 112 is an optional feature of template 100 and other embodiments of alignment guide 112 can have other suitable shapes and be positioned at other suitable locations on template 100.

In one embodiment, face plate 114 is fabricated with clear mylar that is 0.007 inch thick, and alignment guide 112 is fabricated with a polycarbon material that is 0.06 inch thick. Alignment mark 102, damage limit mark 104, and tip chamfer mark 110 are printed on template 100 using a lithographic printing process, or any other suitable marking process. The position of damage limit mark 104 is derived from maintenance manual data that provides dimensions of allowable blend areas for a particular type of blade.

In one method of inspection, template 100 is slid along a side of the blade until alignment guide 112 contacts the edge of the blade. The tip 108 of template 100 is aligned with the tip of the blade, and the damage is assessed in relation to damage limit mark 104 and tip chamfer mark 110. If the damaged area is within damage limit mark 104, the damaged area is marked for blending using the appropriate size blend guide 124, 126, 128.

Face plate 114 is typically fabricated with a flexible material that allows face plate 114 to adapt to the contours of the blade during inspection. The material used for face plate 114 is also typically transparent to allow viewing of damage to the blade when template 100 is overlayed on the blade. Alignment guide 112 can be fabricated using the same material as face plate 114, or any other suitable material. Typically, the material used for alignment guide 112 does not compress or otherwise change shape when abutted against the edge of the blade. The material used for alignment guide 112 can, but is not required to be transparent. Alternatively, template 100 may be fabricated with rigid material that is formed to similar contours of the blade(s) to be inspected.

Figure 2A:
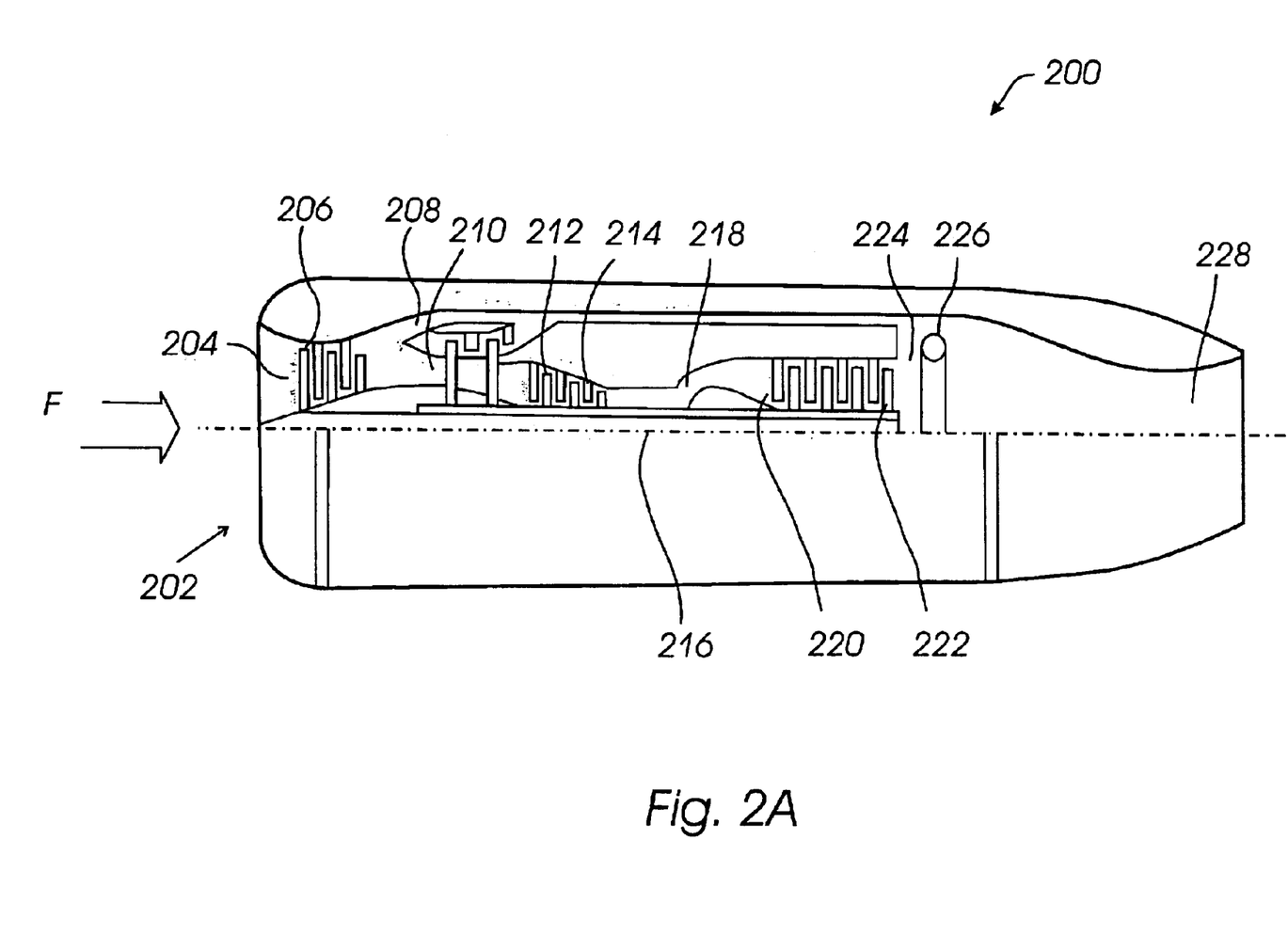
FIG. 2A shows a cross-sectional view of an embodiment of a turbofan engine.

Referring now to FIG. 2A, a partial side cross-sectional view of an embodiment of an axial flow jet aircraft engine 200 is shown as an example of the type of device in which blades are installed and inspected on a routine basis. Air flow F enters jet engine 200 through intake 202. Fan section 204 is located at the very front of engine 200 and comprises a plurality of rotating fan blades 206 that push airflow F into bypass section 208 and compressor section 210. Compressor section 210 is comprised of a plurality of rotating rotor blades 212 and stationery stator blades 214.

Rotor blades 212 compress airflow F into combustion chamber 218 and force airflow F rearward while continuing the direction of airflow F parallel to centerline axis 216 of engine 200. The action of rotor blades 212 increases air compression at each stage and accelerates airflow F rearward. By virtue of this increased velocity, energy is transferred from compressor section 210 to airflow F in the form of velocity energy. Thus, the purpose of compressor section 210 is to take in ambient airflow F, increase the speed and pressure, and discharge airflow F into combustion chamber 218.

Fuel is mixed with airflow F in combustion chamber 218 and ignited, thereby adding energy to airflow F, resulting in an increased pressure and temperature of airflow F. Pressure within combustion chamber 218 forces airflow F into turbine section 220, which is comprised of a plurality of turbine blades 222. Turbine section 220 removes some energy from airflow F to power compressor section 210 and fan section 204. Airflow F then passes into exhaust chamber 224 where it combines with the flow from bypass section 208. An afterburner 226 can provide additional fuel which is ignited to increase the energy of airflow F. Airflow F is then expelled from engine 200 through nozzle 228 as an exhaust flow.

Figure 2B:
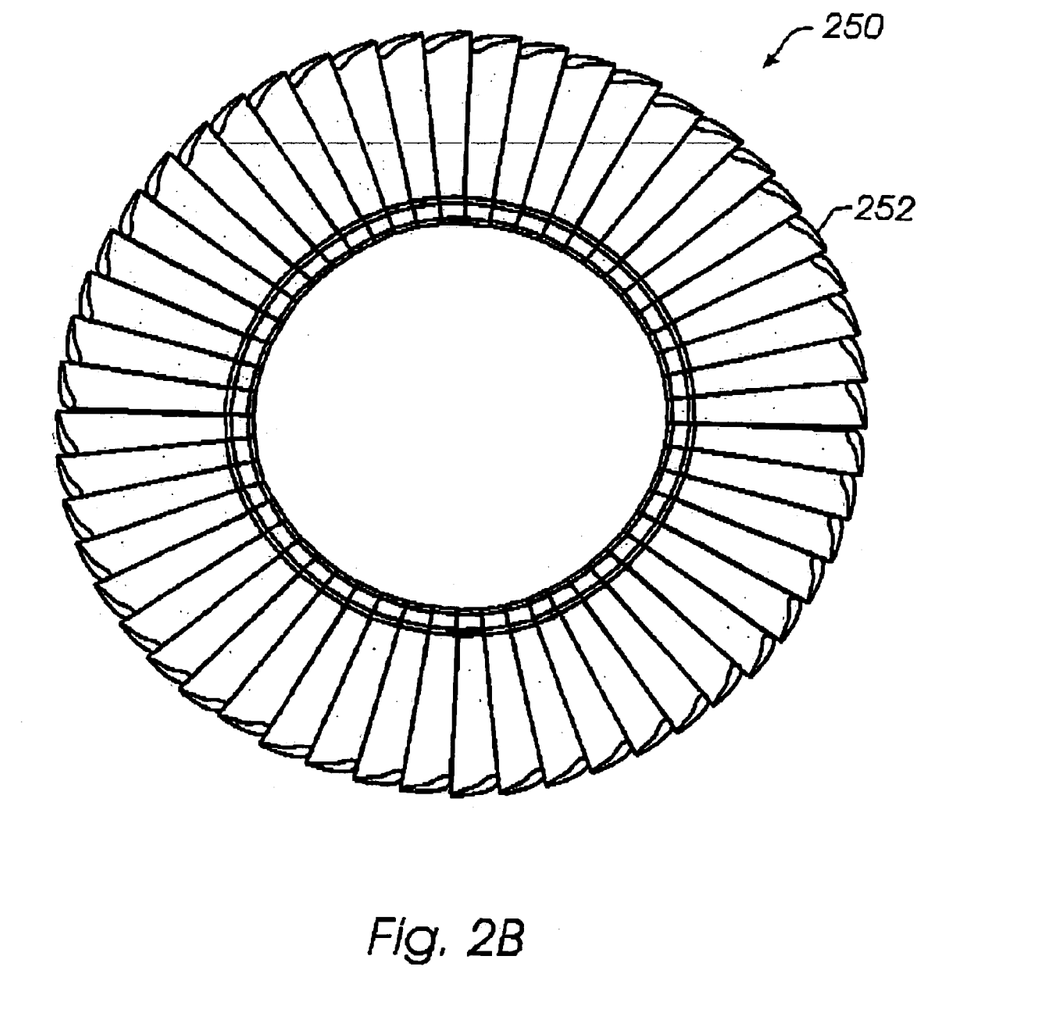
FIG. 2B shows a front view of an embodiment of a rotor assembly that is representative of a fan or compressor stage in the engine of FIG. 2A.

FIG. 2B shows a front view of an embodiment of a rotor assembly 250 that is representative of rotors in the fan section 206, compressor section 210 and turbine section 220 in engine 200 (FIG. 2B). Each set of rotating and stationery (stator) blades comprises a "stage" of fan section 206, compressor section 210 and turbine section 220. The number of stages included in engine 200 depends on the pressure of airflow F required at the beginning and end of compressor section 210, and at the beginning and end of turbine section 220. The size of the blades 252 in blade assembly 250 typically varies for each stage of compressor section 210 and turbine section 220.

Engine 200 can be enclosed in a nacelle mounted externally on an aircraft, or incorporated internally in the aircraft. Objects that can cause damage to blades throughout each section of engine 200 are typically ingested via intake 202 when engine 200 is operating on the ground and in flight. Access ports are typically located near the rotating blade assemblies to allow inspectors to visually inspect the blades using optical or video borescopes while the engine 200 is still mounted in the aircraft. Often, damage to blades at the opening of intake 202 indicates whether other blades in the engine may be damaged. Engine removal and dis-assembly is usually required for detailed inspection of blades other than first stage fan blades.

Figure 3A:
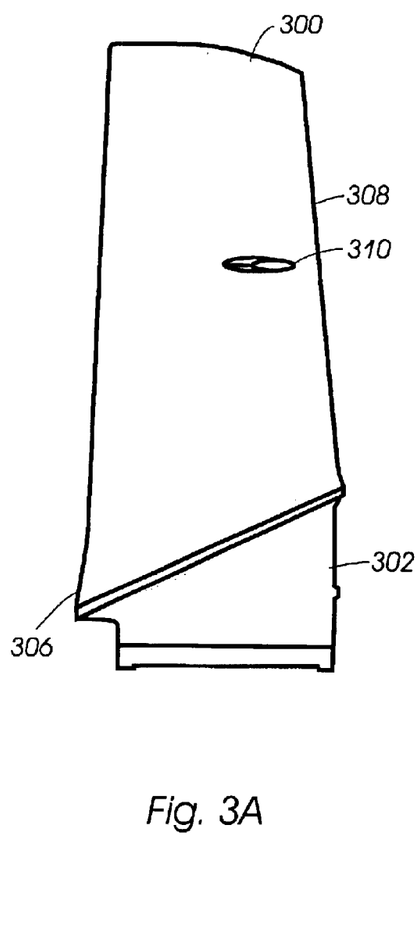
FIG. 3A shows an embodiment of a typical stage 1 fan blade.

FIG. 3A shows an embodiment of a fan blade 300 that can be utilized in a device such as engine 200 (FIG. 2A) and inspected using template 100 (FIG. 1A). Blade 300 includes a root portion 302 that is used to mount and retain blade 300 in a circular rotating fan assembly comprised of a plurality of blades 300, such as blade assembly 250 shown in FIG. 2B. Blade 300 also has leading edge 306 and trailing edge 308. A mid-span damper 310 is a horizontal fin that can be included on both sides of blade 300 to stabilize vibration of blade 300 during operation.

Figure 3B:
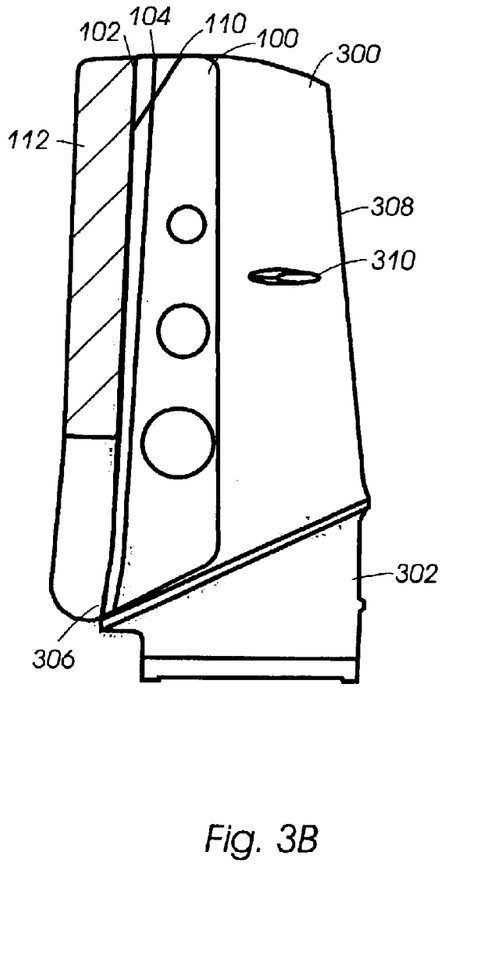
FIG. 3B shows the template of FIG. 1A overlaying the leading edge of the blade of FIG. 3A.

FIG. 3B shows template 100 overlaying blade 300 with alignment mark 102 aligned with leading edge 306 of blade 300. Alignment guide 112 provides a mechanical stop that allows template 100 to be properly positioned against leading edge 306 to determine whether any damage that may be present on blade 300 is within damage limit mark 104 and tip chamfer mark 110.

Figure 3C:
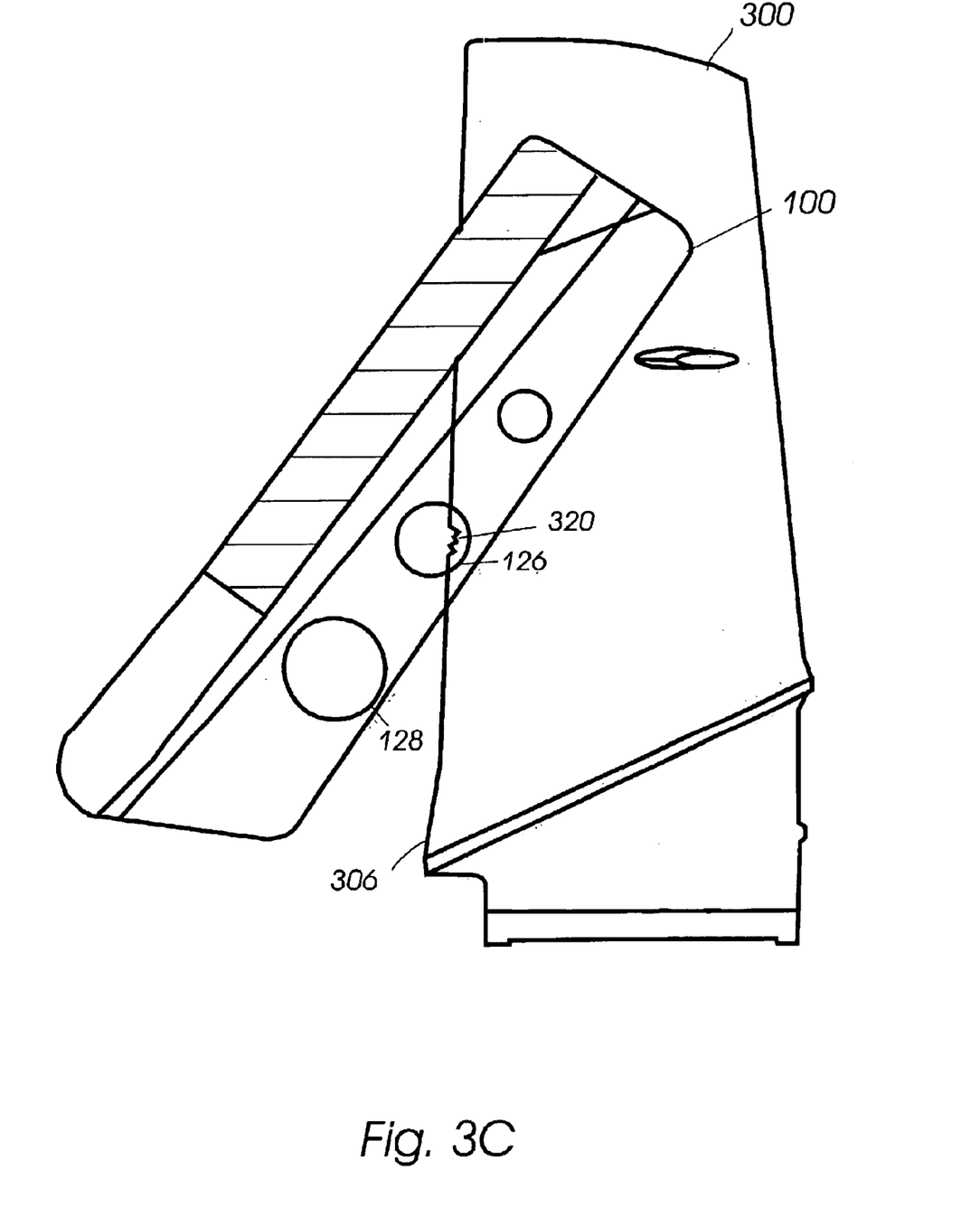
FIG. 3C depicts one of the blend guides on the template of FIG. 1A overlaying a damaged area of a turbine blade.

FIG. 3C depicts template 100 and blade 300 with blend guide 126 overlaying a damaged area 320 of blade 300. Once an inspector determines that damaged area 320 is within damage limit mark 104, he or she can use blend guide 126 to mark the area to indicate the maximum amount of leading edge 306 that can be removed during the blending process without exceeding damage limit mark 104. Once the damaged area 320 is marked, template 100 can again be overlayed on blade 300 as shown in FIG. 3B to ensure the mark around the damaged area 320 does not exceed damage limit mark 104. Maintenance personnel are thus provided with an accurate marking of the allowable blend area around damaged area 320.

Figure 4A:
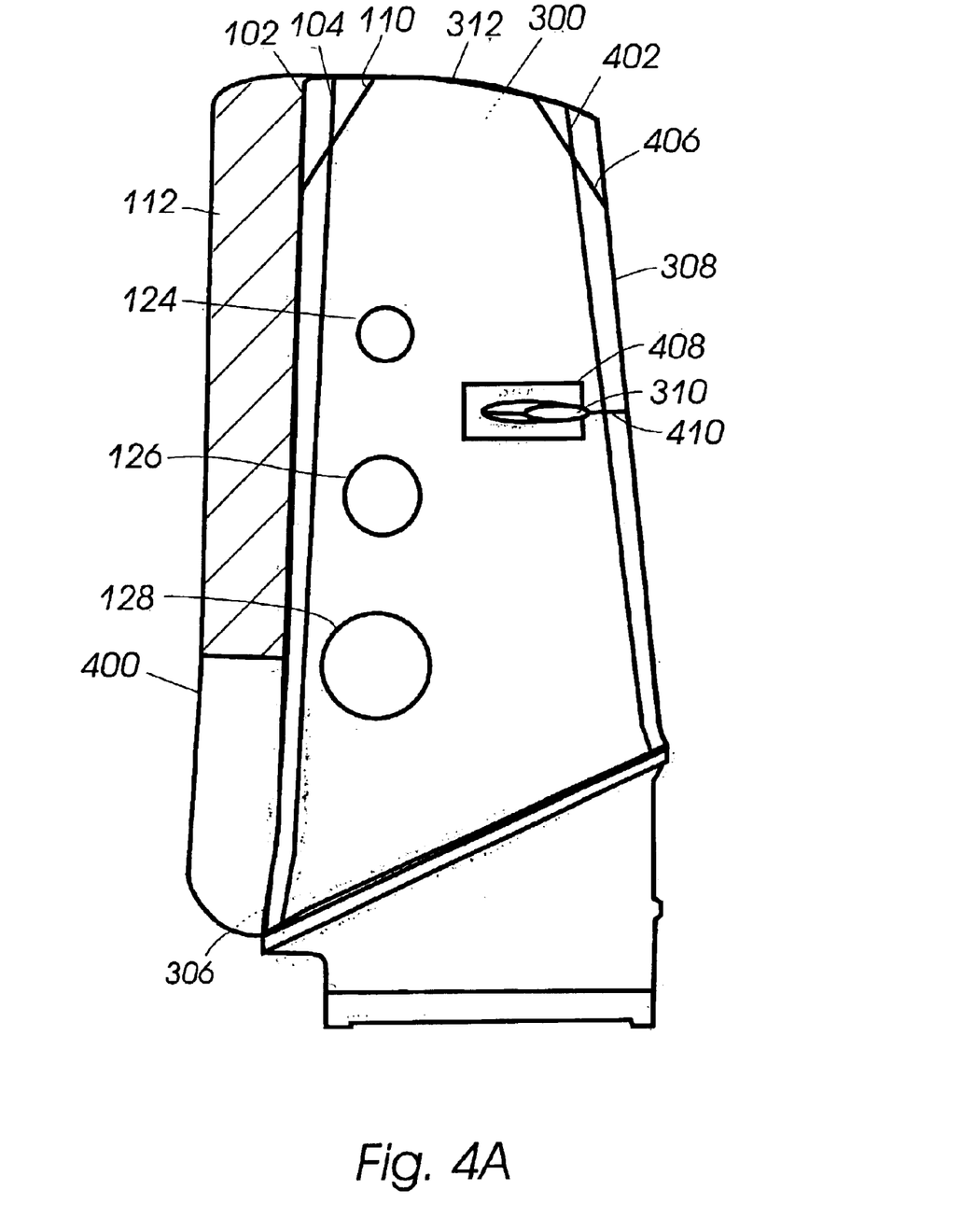
FIG. 4A shows another embodiment of a template for inspecting leading and trailing edges of a blade overlaying the blade of FIG. 3A.

FIG. 4A shows another embodiment of a template 400 for inspecting leading edge 306, trailing edge 308, and tip 312 of blade 300. In addition to alignment mark 102, damage limit mark 104, tip chamfer mark 110, edge guide 112, and blend guides 124, 126, 128 included on template 100 (FIG. 1A), template 400 also includes damage limit mark 402, and tip chamfer mark 406.

When template 400 is sized to substantially match the size of blade 300, an alignment mark for trailing edge 308 of blade 300 is typically not required. A trailing edge alignment mark (not shown) can be provided, however, in other embodiments.

When blade 300 includes damper 310, cutout 408 and slit 410 can be provided in template 400 to allow template 400 to be positioned properly against blade 300.

Figure 4B:
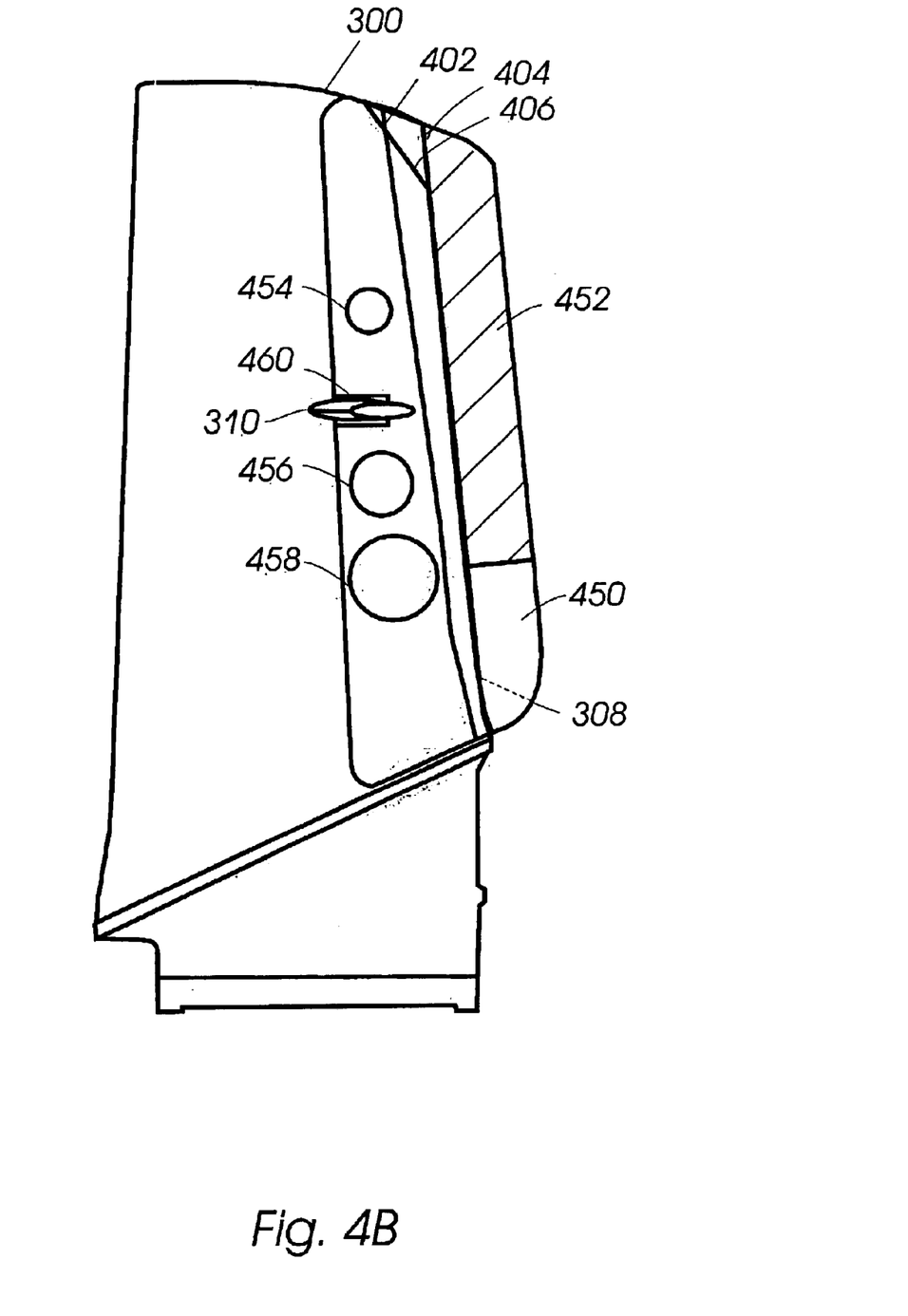
FIG. 4B shows another embodiment of a template for inspecting the trailing edge of a blade overlaying the blade of FIG. 3A.

FIG. 4B shows another embodiment of a template 450 for inspecting trailing edge 308 of blade 300. Template 450 is similar to a reverse image of template 100 (FIG. 1A) and includes damage limit mark 402, alignment mark 404, tip chamfer mark 406, alignment guide 452, and blend guides 454, 456, 458. Notch 460 can be provided to allow proper positioning of template 450 against blade 300 when blade 300 includes damper 310 and the edge of template 450 extends past damper 310.

Figure 5A:
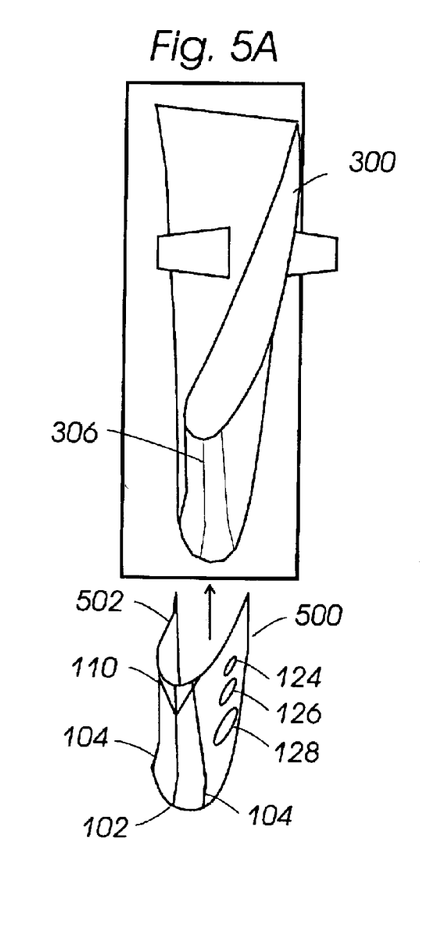
FIG. 5A shows a top perspective view of another embodiment of a template for inspecting the edge of a blade that is shaped to be retained on the blade during inspection.
Figure 5B:
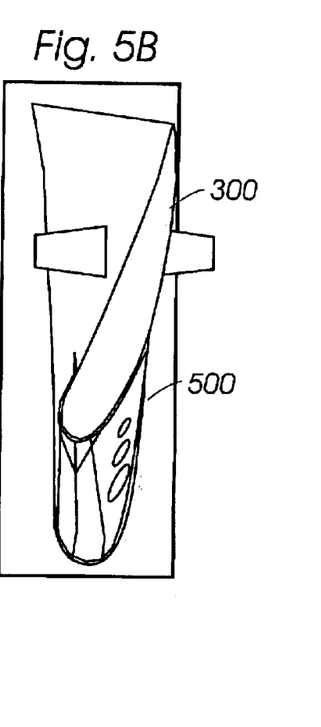
FIG. 5B shows a top perspective view of the template of FIG. 5A engaging the blade.

A mechanism for retaining the blade inspection template in position on the blade can be included. FIGS. 5A and 5B show a top perspective view of an example of a template 500 for inspecting an edge and tip of blade 300 that includes a clip portion 502 to retain template 500 on blade 300. Template 500 includes alignment mark 102 on the leading edge of template 500 that corresponds to leading edge 306 of blade 300. Damage limit marks 104 and tip chamfer marks 110 are included on either side of alignment mark 102. One or more blend guides 124, 126, 128 can also be included on template 500.

Damage limit marks 104 and tip chamfer marks 110 on both sides of alignment mark 102 allow blade 300 to be inspected from either side of blade 300. Clip portion 502 curves around an edge of blade 300, and exerts a gripping force to retain template 500 on blade 300. Template 500 is formed to correspond to the contours of the blade(s) to be inspected using any type of material that can flex to engage blade 300, and return to its previous shape when removed from blade 300. A transparent material allows blade 300 to be viewed under template 500.

Figure 6:
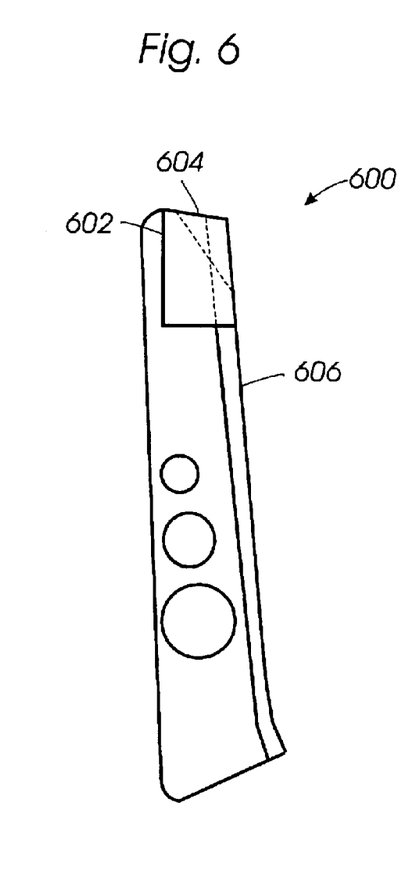
FIG. 6 shows a view of the reverse side of another embodiment of a template for inspecting the edge of a blade that includes a sleeve to retain the template on the blade during inspection.

Other mechanisms for retaining various embodiments of a blade inspection template on a blade can also be included, in addition to, or instead of clip portion 502. Another example of a retaining mechanism is shown on an embodiment of template 600 in FIG. 6 as sleeve 602. In the embodiment shown, sleeve 602 is portion of material attached or formed on the reverse side of template 600 along at least a portion of tip 604 and adjacent alignment edge 606 of template 600. Sleeve 602 is typically most useful to retain template 600 on blades with tips that are not tapered toward the edge to be inspected, and where adequate clearance is available to slip sleeve 602 over the tip of the blade.

Another example of a method for retaining blade inspections templates on the blade to be inspected includes the use of magnets attached to or embedded in the template. Magnets will only be effective, however, in situations where the blades to be inspected have magnetic properties.

Various blade inspection templates in accordance with embodiments of the present invention provide a convenient and effective tool for inspecting and marking damage on blades. The templates can be sized and shaped to be used with virtually any type of blade including blades found in engines, as well as other types of equipment. The templates can be used to inspect, mark, and blend-repair blades while the blades are installed, and even when the blades are disassembled from the equipment in which the blade is used. This capability not only restores degraded performance from damaged blades, but in many cases can also avoids removal of the equipment from service, thereby dramatically reducing maintenance costs.

While the invention has been described with reference to various embodiments, it will be understood that these embodiments are illustrative and that the scope of the invention is not limited to them. Many variations, modifications, additions and improvements of the embodiments described are possible. For example, those having ordinary skill in the art will readily implement the steps necessary to provide the structures and methods disclosed herein. Variations and modifications of the embodiments disclosed herein may be made without departing from the scope of the invention as set forth in the following claims.

In the claims, unless otherwise indicated the article "a" is to refer to "one or more than one".

What I claim is:

1. An apparatus for inspecting a blade, wherein the blade includes a leading edge and a trailing edge, the apparatus comprising:

a template sized and shaped to substantially conform to at least a portion of at least one of the leading and the trailing edges of the blade;

at least one marking on the template to indicate whether the shape of at least one of the leading and trailing edges of the blade is within a pre-specified tolerance; and at least one blend marking guide on the template to provide a guide for marking a blend area around a damaged area on the blade, wherein the blend marking guide comprises an arcuate portion.

2. The apparatus of claim 1, wherein the template is fabricated with a transparent material.

3. The apparatus of claim 1, wherein the template is fabricated with flexible material to allow the template to substantially conform to the contour of the blade when the template is placed against the blade.

4. The apparatus of claim 1, further comprising an alignment guide on the template.

5. The apparatus of claim 4, wherein the alignment guide includes a raised portion that is abuttable against one of the leading and the trailing edges of the blade.

6. The apparatus of claim 1, wherein the template includes a sleeve portion configured on the template, wherein the sleeve portion is closed along at least a portion of the top edge of the blade to retain the template on the blade during inspection.

7. The apparatus of claim 1, wherein the template includes a clip portion to retain the template on the blade during inspection.

8. The apparatus of claim 1, wherein at least a portion of the template is magnetic to retain the template on the blade during inspection.

9. A blade inspection template comprising:

a first damage limit mark on the template, wherein the template is configured to be overlaid on the blade to determine whether a damaged portion of the blade is within the damage limit mark; and a blend guide on the template for marking a blend area around a damaged area on the blade, wherein the blend marking guide comprises an arcuate portion.

10. The template of claim 9, further comprising:

a positioning guide configured to align the template in a desired position with respect to the blade.

11. The template of claim 10, wherein the positioning guide includes a raised portion to rest against a portion of the blade when the template is overlaid on the blade.

12. The template of claim 9, wherein the template is fabricated with transparent material to allow the blade to be viewed when the template is overlaid on the blade.

13. The template of claim 9, further comprising:

means for retaining the template on the blade.

14. The template of claim 9, further comprising:

a tip chamfer mark indicating a blade corner trim limit.

15. The template of claim 9, further comprising:

a blade alignment mark indicating at least a portion of an edge of the blade.

16. The template of claim 9, wherein the blend guide comprises a plurality of arcuate portions and each arcuate portion has a different curvature.

17. The template of claim 9, wherein the template is configured to correspond to the size and shape of the blade.

18. The template of claim 9, wherein the blade comprises a leading edge and a trailing edge, the template further comprising:

a first blade alignment mark indicating at least a portion of the blade.

19. The template of claim 18, further comprising:

a second damage limit mark indicating the amount of damage allowable on another portion of the blade.

20. A method of fabricating a template for inspecting a blade comprising:

providing an alignment mark on the template, wherein the alignment mark is used to align the template against the blade during inspection;

providing a damage limit mark on the template, wherein the damage limit mark is spaced from the alignment mark and indicates an allowable distance to which a damaged area may extend from at least one of a leading, trailing, and corner edge of the blade; and providing a blend guide positionable over the damaged area of the blade, wherein the blend marking guide comprises an arcuate portion.

21. The method as set forth in claim 20 further comprising: providing a retaining portion to retain the template on the blade.

* * * * *